US007090062B2

(12) United States Patent
Jennings

(10) Patent No.: US 7,090,062 B2
(45) Date of Patent: Aug. 15, 2006

(54) CLUTCH ROLLER YOKE

(75) Inventor: Mark K. Jennings, Vancouver, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/728,283

(22) Filed: Dec. 4, 2003

(65) Prior Publication Data

US 2004/0144613 A1   Jul. 29, 2004

Related U.S. Application Data

(60) Provisional application No. 60/431,260, filed on Dec. 6, 2002.

(51) Int. Cl.
*F16D 23/14* (2006.01)
(52) U.S. Cl. ............... 192/70.29; 192/82 R; 192/99 S; 192/110 B
(58) Field of Classification Search ............. 192/70.29, 192/70.3, 82 R, 99 S, 110 B; 74/473.37; 384/296
See application file for complete search history.

(56) References Cited

U.S. PATENT DOCUMENTS

| 1,611,557 | A | * | 12/1926 | Reed | .......................... 192/98 |
| 1,966,100 | A | * | 7/1934 | McAdams et al. | ........ 192/56.53 |
| 2,354,621 | A | * | 7/1944 | Spase | .......................... 192/98 |
| 3,193,335 | A | * | 7/1965 | Wing | ........................ 384/296 |
| 5,385,422 | A | * | 1/1995 | Kruger | ....................... 403/371 |
| 6,102,181 | A | * | 8/2000 | Lepard et al. | ........... 192/70.29 |
| 6,126,356 | A | * | 10/2000 | Russell | ........................ 403/24 |
| 6,648,512 | B1 | * | 11/2003 | Storch et al. | ................ 384/275 |
| 6,811,012 | B1 | * | 11/2004 | Grillo | .......................... 192/98 |
| 2003/0106765 | A1 | * | 6/2003 | Cole et al. | ................ 192/99 S |

FOREIGN PATENT DOCUMENTS

JP         59229631 A  * 12/1984

* cited by examiner

*Primary Examiner*—Richard M. Lorence
(74) *Attorney, Agent, or Firm*—Rader, Fishman & Grauer PLLC

(57) ABSTRACT

A heavy duty clutch release mechanism including a driveline master clutch release yoke where a bearing support shaft is used to minimize bearing end loading. The clutch release yoke is rotatably fixed to the clutch release shaft for rotation and having first and second forks extending adjacent to the release bearing assembly. The yoke includes a number of bearing support shafts having a first end attached to an inboard side of the first and second forks and a second end having a retention flange. The bearing elements are rotatably mounted on the bearing support shafts and engaging the surface of the clutch release bearing.

20 Claims, 5 Drawing Sheets

US 7,090,062 B2

CLUTCH ROLLER YOKE

This application claims the benefit of U.S. Provisional Application No. 60/431,260, filed Dec. 6, 2002, the entire contents of which are herein incorporated by reference.

FIELD OF INVENTION

The present invention relates to a driveline master clutch release yoke and more specifically to a driveline master clutch release yoke where a bearing support shaft is used to minimize bearing end loading.

BACKGROUND OF THE INVENTION

A heavy duty clutch release mechanism known in the art includes a clutch release sleeve, a clutch release bearing and a clutch release yoke. The clutch release lever has a lever engagement feature at a first end. The clutch release bearing engages a second end of the clutch release sleeve and has an inner race rotatably fixed to the second end of the clutch release sleeve. The clutch release yoke has roller assemblies disposed on each of two arms for engagement with an outer race of the clutch release bearing.

Unfortunately, the roller assemblies have several problems. Among other things the bearing elements associated with the roller assemblies have been subjected to the build up of contamination over time in combination with excessive end loading. Thus, the roller assemblies have failed sooner than would be optimally desired.

SUMMARY OF THE INVENTION

The present invention provides a solution to a field problem when a roller assembly with bearing element is used on each fork end of a clutch release yoke. The release yoke includes at least two forks connected by a bridge section. The forks each have an inwardly extending bearing support shaft such that the bearing element supported thereon can engage a clutch release bearing. A retention flange is formed at one end of the bearing support shaft to hold the bearing element in the proper position and to protect the bearing from end loading. Another advantageous result is that the improved retention flange also protects the roller bearing from harmful contamination. As a result premature aging of the roller assembly is minimized.

Another advantage is that a positioning snap ring becomes optional since the bearing element can be held between the retention flange and an inner surface of the fork, providing enhanced performance while simplifying assembly and reducing cost.

DESCRIPTION OF THE PREFERRED EMBODIMENTS

Figure 1:
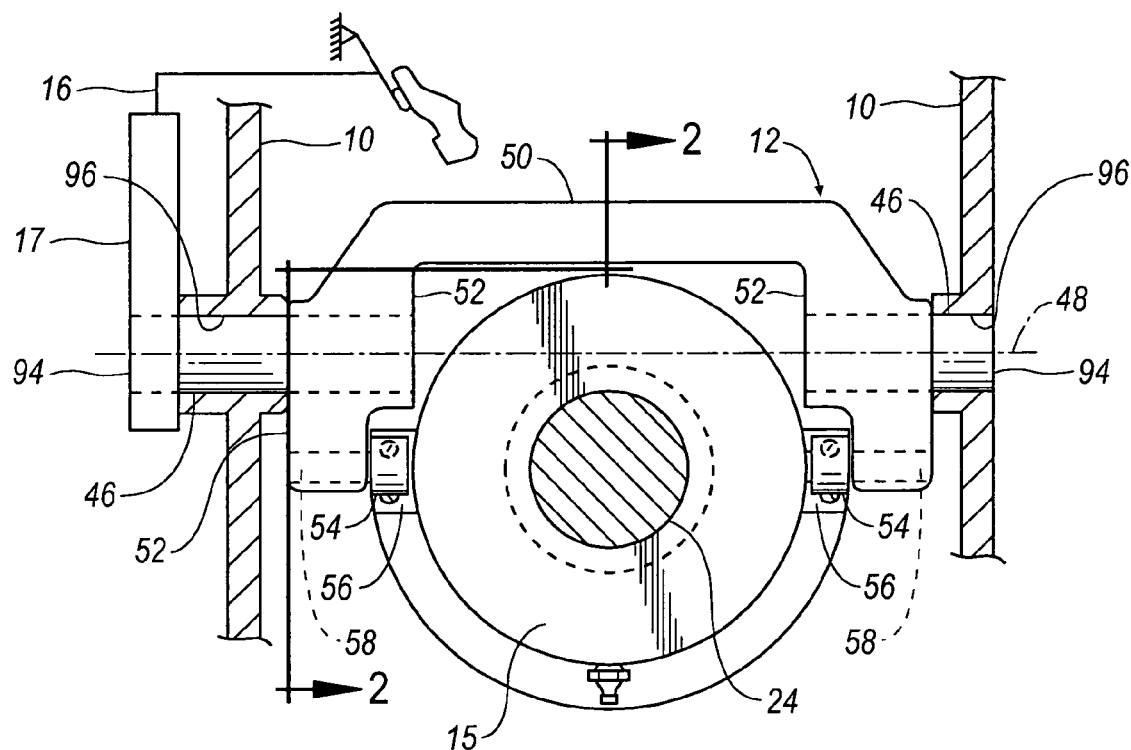
FIG. 1 is a rearward facing end view of a clutch release yoke and clutch fork.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

FIG. 1 illustrates a clutch housing 10 pivotably supporting a clutch yoke 12. Clutch yoke 12 is used to selectively disengage clutch assembly 14, best shown in FIG. 4, through displacement of a clutch release bearing assembly 15. A clutch linkage 16 disposed between a vehicle operator and the clutch yoke 12 includes an operating lever 17 disposed outside of clutch housing 10.

Figure 4:
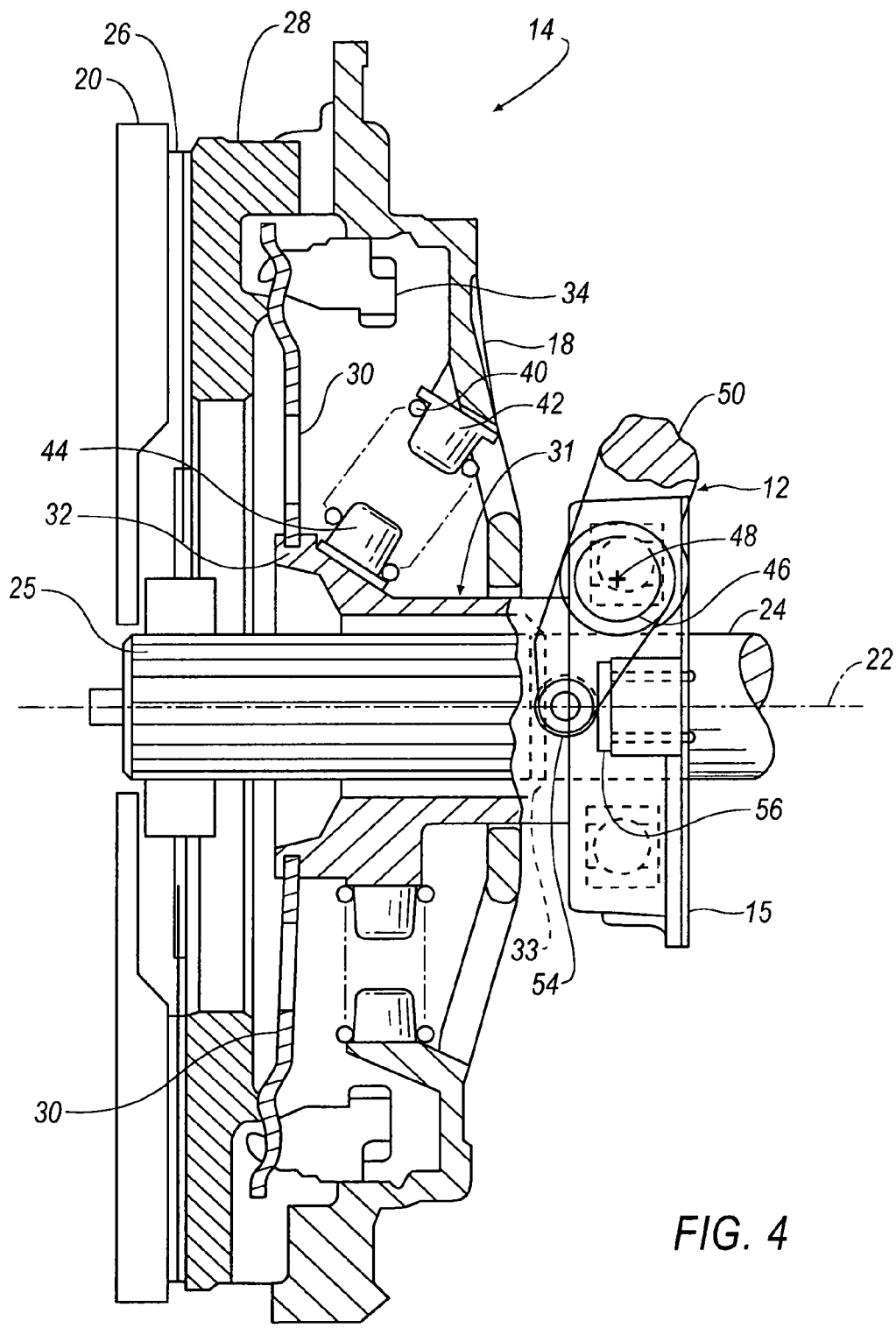
FIG. 4 is a sectional side view of the clutch assembly in a released position.

As illustrated in FIG. 4, clutch assembly 14 includes a clutch cover 18 fixed to a flywheel 20. In turn, flywheel 20 is secured to an engine crankshaft (not shown) for rotation about an axis of rotation 22. A transmission input shaft 24, splined on a first end 25, extends from a transmission case (not shown) along axis 22. A pressure plate 28 is disposed between the clutch cover 18 and the flywheel 20 for axial movement therebetween, and it is rotatably fixed to the cover. A clutch driven disc 26 is rotatably fixed to the transmission input shaft 24 by way of the splined first end 25, and positioned between the flywheel 20 and the pressure plate 28 for axially slidable movement between the flywheel and pressure plate. Pressure plate 28 selectively compresses driven disc 26 against flywheel 20.

A clutch release sleeve 31 extends about axis 22 and is slidably and rotatably disposed on the transmission input shaft 24. It includes a first end 32 disposed between the pressure plate 28 and the clutch cover 18 and a second end 33 disposed on a side of the cover opposite the pressure plate 28. A plurality of clutch apply levers 30 are circumferentially distributed about axis 22, and extend radially from first end 32 of the release sleeve 31. Levers 30 include a radially inwardly disposed ends engaging first end 32 of the release sleeve 31. A radially outer end of each lever 30 extends between release sleeve 31 and the pressure plate 28 and engages cover 18 directly, or indirectly by way of an adjusting mechanism 34.

Figure 5:
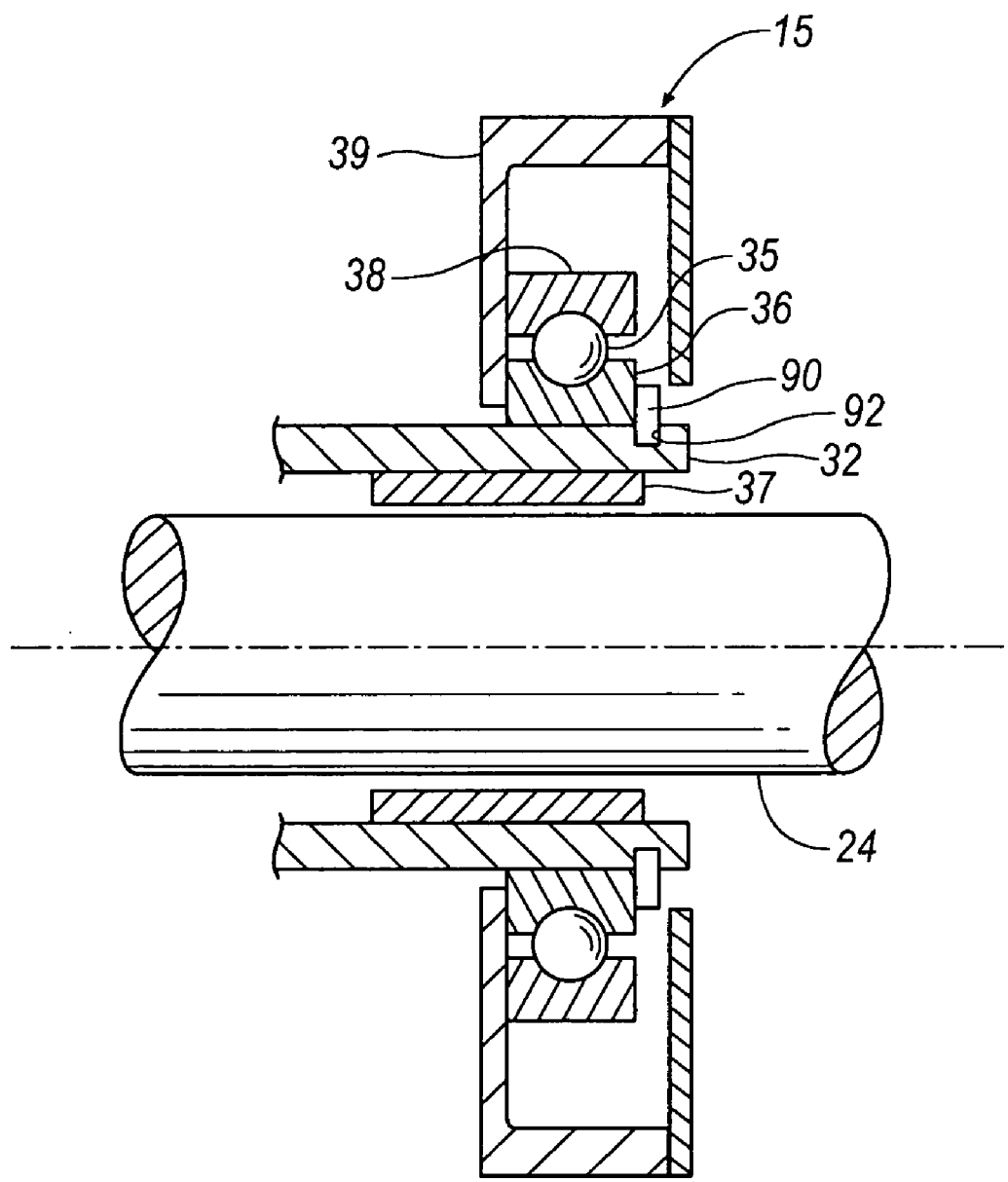
FIG. 5 is a sectional side view of the release bearing assembly.

As best illustrated in FIG. 4 bearing release assembly 15 is disposed outside the clutch cover 18 and is connected to second end 33 of sleeve 31. As shown in FIG. 5, an inner race 36 of release bearing assembly 15 is engaged with release sleeve 31 at second end 33 for axial movement therewith. A snap ring 90 helps retain inner race 36 on sleeve 32 and is received in a groove 92 circumferentially disposed about an outer surface of sleeve 31 such that the snap ring is contacts the inner race 36. An input shaft bushing 37 is press-fit in sleeve 31 in axial alignment with bearing assembly 15. An outer race 38, rotatably fixed to a bearing housing 39, is prevented from rotating relative to clutch housing 10. The outer race 38 is separated from the inner race by bearing members 35.

As shown in FIG. 4, angle springs 40, which develop the clutch apply loads, are disposed between clutch cover 18 and the first end 32 of sleeve 31. Both the sleeve 31 and cover 18 have corresponding spring engaging features 42 and 44 respectively.

Figure 2:
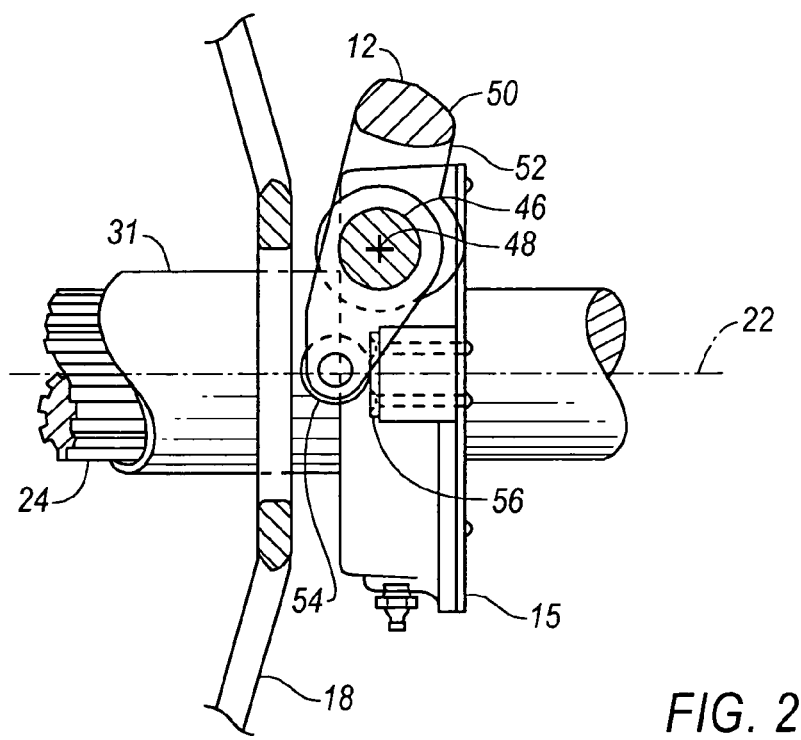
FIG. 2 is a side view of the release yoke and fork of FIG. 1 shown in the direction of arrows 2.
Figure 3:
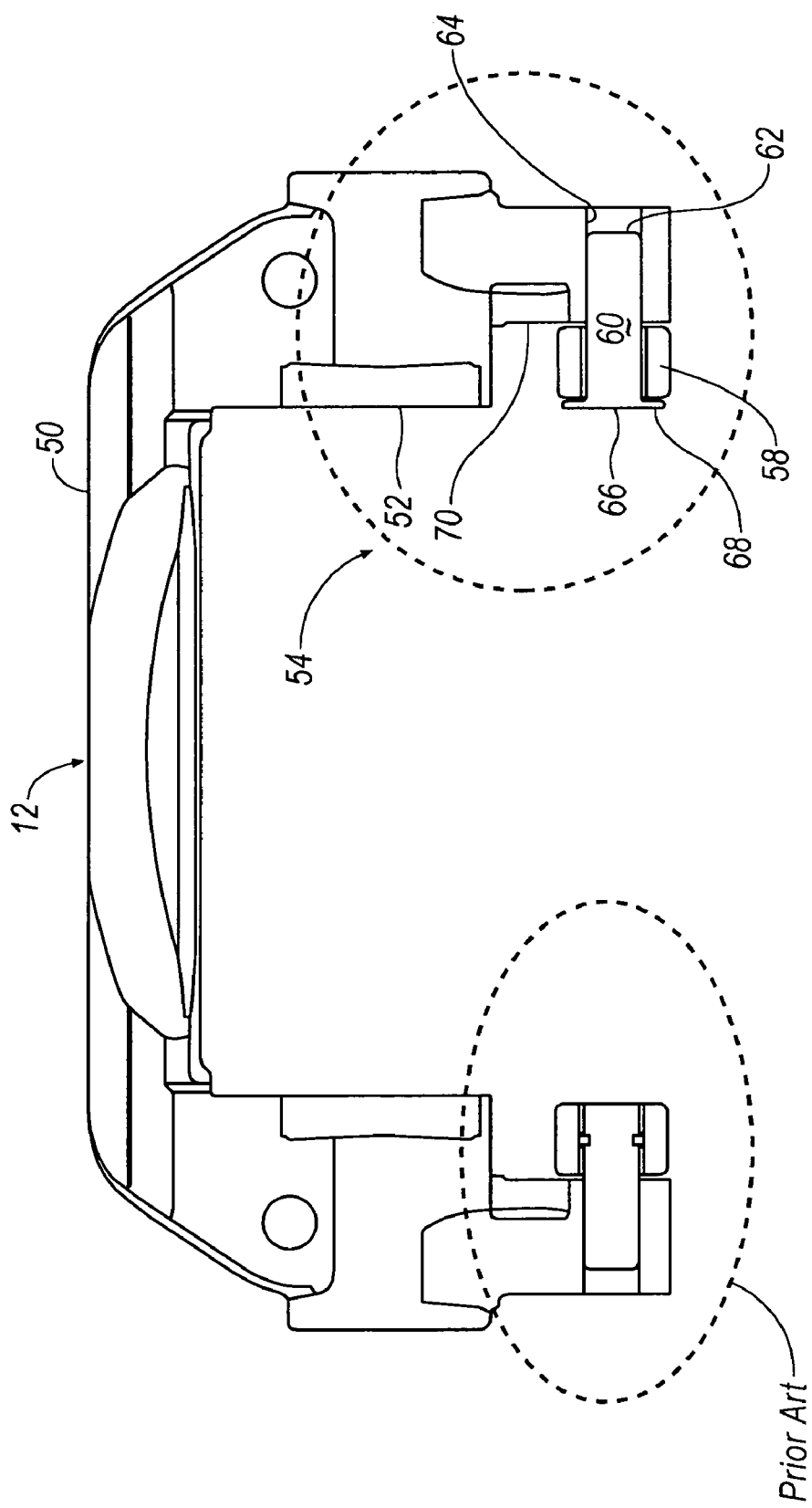
FIG. 3 is a partial cross-sectional view of both the prior art roller assembly and the roller assembly of the present invention.

Clutch yoke 12, shown best in FIGS. 1 through 3, straddles clutch release bearing assembly 15 and is secured to two coaxial fork shafts 46 for pivoting about pivot axis 48, defining a second axis of rotation at a right angle with respect to the axis of rotation 22. Preferably, pivot axis 48 is closer to the axis of rotation than clutch release bearing assembly outer race 38. An opposing end 94 of each fork shaft 46 is received within a corresponding opening 96 of clutch housing 10. One of the fork shafts 46 has an extended axial extent to such that its opposing end is fixed to an operating lever 17 such that movement of operating lever 17 will result in rotation of clutch yoke 12. Thus, fork shafts 46 each act as a clutch release shaft.

A cross member 50 of yoke 12 connects two opposed arms 52 adjacent bearing assembly 15. Each of the arms 52 have roller assemblies 54 positioned on an inboard side of an arm 52. Roller assembly 54 engages wear pads 56 on a forward side of bearing assembly 15.

Roller assembly 54 and release bearing assembly 15 are designed as a matched set so that the axial position of sleeve 31 varies as a function of the rotative position of lever 17 exactly as the position of sleeve 31 would vary with the position of lever 17 in a non-roller system. This allows the roller yoke 12 to be installed in a system not explicitly designed for compatibility with a roller fork. The arms 52 of yoke 12 have been widened to make them more resistant to the torsional twisting force introduced by the cantilevered roller assembly 54.

The roller assembly 54 is shown in more detail on the right hand side of FIG. 3, where for the purpose of illustration, the prior art roller discussed in the Background of the Invention is shown on the left hand side. Roller assembly 54 includes a bearing element 58 circumferentially disposed about an outer surface of a bearing support shaft 60. Bearing element 58 is not limited to one particular type of bearing design. For example, if a roller bearing is used, such roller bearings may include needle bearings, ball bearings, sleeve bearings and plastic bearings of various designs.

Bearing support shaft is typically made from steel and includes a first end 62 received within a corresponding opening 64 of one of the arms 52 and a second end 66 including a radially outwardly extending retention flange 68. Typically, the shaft 60 is compression fitted within opening 64 although any securement mechanism, including a threaded arrangement, may be used. Bearing element 58 is disposed between flange 68 and an inner surface 70 of arm 52 adjacent to opening 64.

Figure 6:
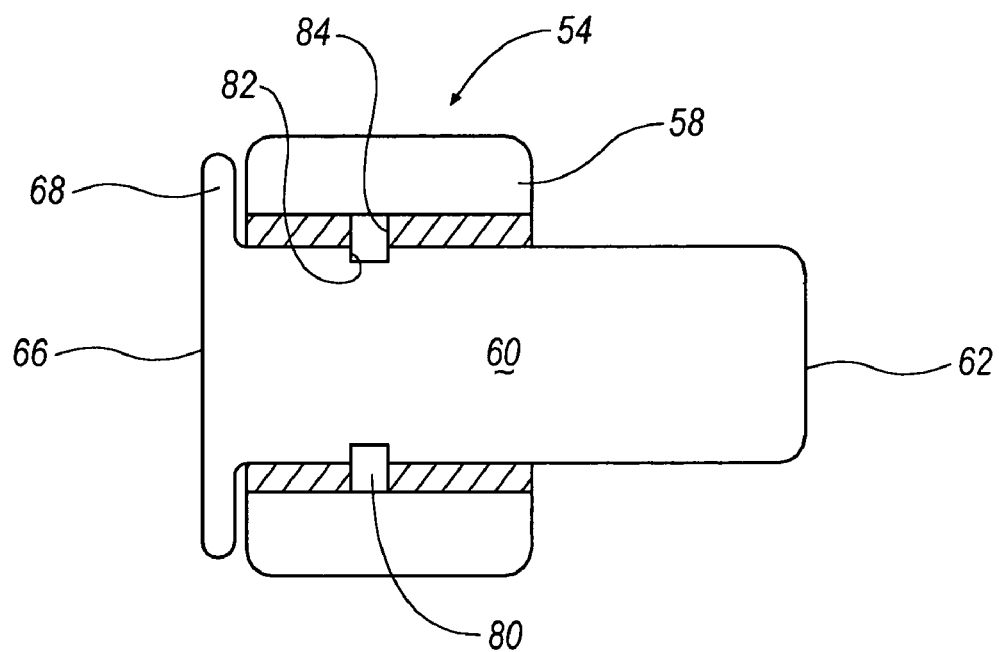
FIG. 6 is a cross-sectional view of an embodiment of the roller assembly of FIG. 3 showing a positioning snap ring.
Figure 7:
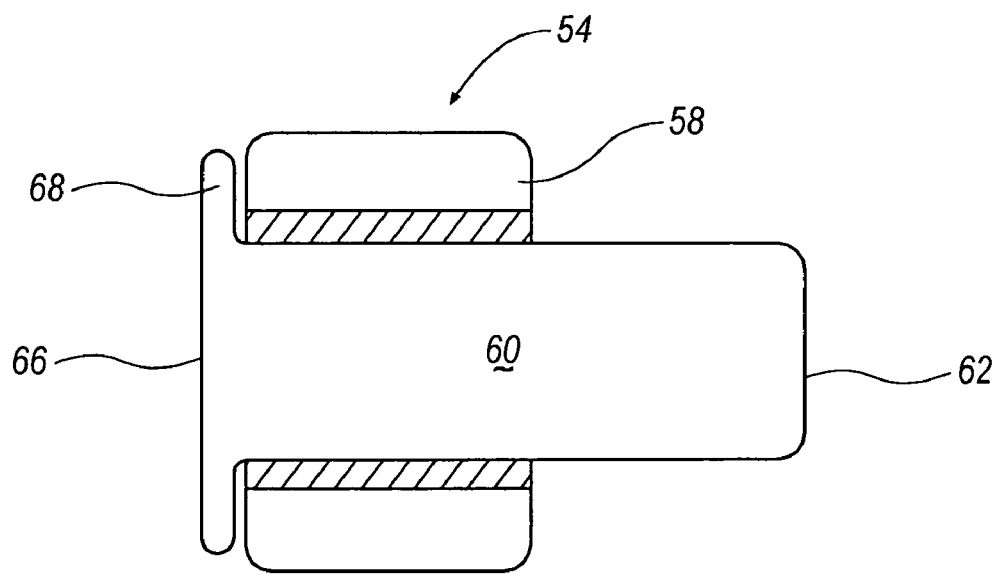
FIG. 7 is a cross-sectional view of an embodiment of the roller assembly of FIG. 3 showing no positioning snap ring.

Two embodiments of the roller assembly 54 are shown in FIGS. 6 and 7, respectively. In the embodiment of FIG. 6, a roller assembly 54 includes a positioning snap ring 80 disposed between aligned grooves 82 and 84 of the support shaft 60 and bearing element 58.

A more preferred embodiment of roller assembly 54 is illustrated in FIG. 7, where there is no positioning snap ring 80.

A roller assembly 54 in accordance with the present invention provides a number of advantages including the reduction of wear on the clutch release bearing assembly.

Further, the addition of a retention flange 68 provides a significant improvement over the roller assemblies known in the prior art. For example, as illustrated in FIG. 7, it helps to hold bearing element 58 in a proper position independently of any snap ring 80. Moreover, it protects the bearing element from undesirable end loading. Further, retention flange 68 protects bearing element from harmful contamination. In the illustrated embodiment, the radial extent of retention flange 68 is such that it substantially covers an end portion of bearing element 58 and most specifically covers and protects the portion of bearing element 58 in contact with shaft 60. In some preferred embodiments, however, it may be desirable to have the radial extent of flange 68 extend even further to provide additional protection to bearing element 58.

The invention operates in the following manner. FIG. 4 shows the clutch in an engaged position. The position of clutch fork 12 and lever 17 is controlled by the position of release bearing assembly 15, which is in turn controlled by the travel limits of levers 31 against pressure plate 28, responsive to the force of springs 40. When the clutch is released by the operator through linkage 16, operating lever 17 rotates clutch fork 12, axially displacing release bearing assembly 15 rearwardly against the force of springs 40 to unload pressure plate 28. The unloading of pressure plate 28 unclamps driven disc 26, enabling relative rotation between driven disc 26 and pressure plate and flywheel 28 and 20. The second or pivot axis 48 is now forward of, or closer to the flywheel 20 than the bearing members. The pivot axis 48 remains closer to the rotative axis than the outer race 38.

As fork 12 is pivoted to the disengaged position, roller assemblies 54 move in a first direction along wear pads 56. As the clutch is reengaged by the operator, roller assemblies 54 move in a second direction, opposite the first direction, along wear pads 56. Roller assemblies 54 prevent the undesired wear of sleeve 37 by eliminating substantially all of the frictional drag of fork 12 against pads 56.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A clutch assembly for rotatably connecting a motor vehicle engine crankshaft with a transmission input shaft, the clutch comprising:
    a flywheel rotatably disposed on an axis of rotation;
    a transmission input shaft disposed on the axis of rotation and having a splined portion;
    a clutch cover fixed to the flywheel;
    a pressure plate disposed between the clutch cover and the flywheel for axial movement therebetween and rotatably fixed to the cover;
    a clutch driven disc rotatably fixed to the input shaft through the splined portion and disposed between the flywheel and the pressure plate for axially slidable movement therebetween;
    a clutch release sleeve slidably and rotatably disposed on the input shaft having a first end disposed between the pressure plate and the cover and having a second end disposed on a side of the cover opposite the pressure plate;
    a plurality of radially oriented levers distributed about the axis of rotation and having radially inwardly disposed ends engaging the first end of the release sleeve and the levers extending between the release sleeve and the pressure plate;
a spring disposed between the sleeve and the cover biasing the pressure plate toward the driven disc;
a clutch release bearing assembly connected to the second end of the release sleeve and disposed outside the clutch cover and the clutch release bearing assembly also having an engagement surface, the clutch release bearing assembly having an outer non-rotational race separated from an inner race by bearing members;
a clutch housing disposed over the clutch cover and the release bearing;
a clutch release shaft rotatably disposed in the clutch housing and pivotable about a second axis oriented at 90 degrees to the axis of rotation, the second axis being closer to the axis of rotation than the clutch release bearing assembly outer race;
a clutch release yoke rotatably fixed to the clutch release shaft for rotation therewith and having first and second forks extending adjacent to the release bearing assembly, said forks having an opening;
a plurality of bearing support shafts having a first end attached to an inboard side of said first and second forks and a second end having a retention flange; and
a plurality of bearing elements rotatably mounted on said bearing support shafts and engaging the engagement surface of the clutch release bearing; and
whereby an end load applied to said retention flange is transmitted through said retention flange and through a corresponding support shaft, bypassing said bearing elements such that said bearing elements are protected from said end load.

2. The clutch as claimed in claim 1 wherein said bearing elements are retained in position respectively on said bearing support shafts using a snap ring.

3. The clutch assembly of claim 1 wherein said roller bearings are retained in position respectively on said bearing support shafts by said retention flanges and said inboard side of said first and second forks.

4. The clutch assembly of claim 1 wherein said bearing elements are roller bearings.

5. The clutch assembly of claim 4, wherein said roller bearings are needle bearings.

6. The clutch assembly of claim 4 wherein said roller bearings are bushings.

7. The clutch assembly of claim 4 wherein said roller bearings are ball bearings.

8. The clutch assembly of claim 1 wherein said retention flange substantially covers an end portion of said bearing element.

9. A clutch release mechanism comprising:
a clutch release sleeve having a lever engagement feature at a first end and a rotational axis;
a clutch release bearing assembly engaging a second end of the clutch release sleeve and having an inner race rotatably fixed to the second end of the clutch release sleeve and having an outer nonrotational race separated from the inner race by a bearing member;
a clutch release yoke having bearing elements disposed on respective bearing support shafts attached to each of two forks for engagement with the clutch release bearing assembly, the clutch release yoke having a pivotal axis closer to the rotational axis than the outer race and the yoke pivotal axis being forward of the bearing elements when the clutch release bearing assembly is moved by the clutch release yoke to a released position; and
said bearing support shafts including retention flanges formed at one end of each of said support shafts for retaining said bearings elements; and
whereby an end load applied to said retention flange is transmitted through said retention flange and through a corresponding support shaft, bypassing said bearing elements such that said bearing elements are protected from said end load.

10. A clutch release yoke for a driveline clutch comprising:
a bridge section hinged to rotate with respect to a clutch housing;
a plurality of forks extending from said bridge section;
a plurality of respective bearing support shafts attached to an inboard side of said forks;
a plurality of respective bearing elements disposed on said bearing support shafts, said support shafts having a respective retention flange formed on an end opposite to said inboard side of said fork; and
whereby an end load applied to said retention flange is transmitted through said retention flange and through a corresponding support shaft, bypassing said bearing elements such that said bearing elements are protected from said end load.

11. The release yoke of claim 10 wherein said bearing element is retained in position on said support shaft using a snap ring.

12. The release yoke of claim 10 wherein said bearing element is retained in position by said retention flange and said inboard side of said fork.

13. The release yoke of claim 10 wherein said bearing element is a roller bearing.

14. The release yoke of claim 13, wherein said roller bearing is a needle bearing.

15. The release yoke of claim 13, wherein said retention flange substantially covers an end of said roller bearing.

16. The release yoke of claim 10, wherein said roller bearings engage a clutch release bearing.

17. A roller assembly for use with a clutch assembly, secured in an opening of a clutch yoke arm comprising:
a bearing element circumferentially disposed about an outer surface of a bearing support shaft;
said bearing support shaft with a first end including a radially outwardly extended retention flange and a second end received within said opening of said yoke arm, said bearing support shaft being attached to an interior surface of said opening; and
whereby an end load applied to said retention flange is transmitted through said retention flange and through a corresponding support shaft, bypassing said bearing elements such that said bearing elements are protected from said end load.

18. The roller assembly of claim 17 wherein the bearing element is a roller bearing including one of a needle bearing, a ball bearing, a sleeve bearing, and a plastic bearing.

19. The roller assembly of claim 17 wherein the roller assembly includes a positioning snap ring disposed in a groove in the bearing element.

20. The roller assembly of claim 17 wherein the bearing support shaft includes a threaded arrangement adapted to engage a threaded surface of said opening.

* * * * *